(12) United States Patent
Vuori (10) Patent No.: US 9,860,594 B2
(45) Date of Patent: Jan. 2, 2018

(54) METHOD AND APPARATUS FOR IMAGE FRAME IDENTIFICATION AND VIDEO STREAM COMPARISON

(71) Applicant: Supponor OY, Ristiina (FI)

(72) Inventor: Arto Vuori, Helsinki (FI)

(73) Assignee: Supponor OY, Ristiina (FI)

( * ) Notice: Subject to any disclaimer, the term of this patent is extended or adjusted under 35 U.S.C. 154(b) by 0 days.

(21) Appl. No.: 15/026,794

(22) PCT Filed: Oct. 3, 2014

(86) PCT No.: PCT/EP2014/071224
§ 371 (c)(1),
(2) Date: Apr. 1, 2016

(87) PCT Pub. No.: WO2015/049367
PCT Pub. Date: Apr. 9, 2015

(65) Prior Publication Data
US 2016/0227275 A1    Aug. 4, 2016

(30) Foreign Application Priority Data

Oct. 3, 2013    (GB) .................................. 1317529.4

(51) Int. Cl.
*H04N 21/44*    (2011.01)
*G06K 9/00*    (2006.01)
(Continued)

(52) U.S. Cl.
CPC ... *H04N 21/44016* (2013.01); *G06K 9/00744* (2013.01); *H04N 21/44008* (2013.01); *H04N 21/84* (2013.01); *H04N 21/8549* (2013.01)

(58) Field of Classification Search
CPC ....... H04N 21/44016; H04N 21/44008; H04N 21/84; H04N 21/8549; G06K 9/00744
(Continued)

(56) References Cited

U.S. PATENT DOCUMENTS 8,649,573 B1 * 2/2014 Darbari .............. G06K 9/00751
382/118
2003/0025834 A1 * 2/2003 Atkin ..................... H04H 20/14
348/500
(Continued)

FOREIGN PATENT DOCUMENTS

GB    2485695 A    5/2012
WO    0158147 A1    8/2001
(Continued)

OTHER PUBLICATIONS

International search report, international application No. PCT/EP2014/071224, dated Feb. 5, 2015. European Patent Office, Rijswijk, NL.
(Continued)

*Primary Examiner* — Mishawn Hunter
(74) *Attorney, Agent, or Firm* — Coats & Bennett, PLLC (57) ABSTRACT

A method and apparatus 200 are provided for identifying image frames 10 in a video stream 20, and for comparing one video stream 20-1 against one or more other video streams 20-2. The or each video stream 20 is examined to produce a respective digest stream 320-1 comprising digest values 310-1, which may be recorded in a digest record 410. A candidate image frame 10-2 from a second video stream 20-2 provides a respective second digest value 310-2. A match of the digest values indicates matching images in the respective video streams.

19 Claims, 8 Drawing Sheets

(51) Int. Cl.
*H04N 21/84* (2011.01)
*H04N 21/8549* (2011.01)

(58) Field of Classification Search
USPC .................. 386/278, 286; 348/500, 705
See application file for complete search history.

(56) References Cited

U.S. PATENT DOCUMENTS

| | | | |
|---|---|---|---|
| 2003/0210886 A1* | 11/2003 | Li | G06F 17/30793 |
| | | | 386/241 |
| 2008/0317278 A1 | 12/2008 | Lefebvre et al. | |
| 2009/0025039 A1 | 1/2009 | Bronstein et al. | |
| 2009/0245750 A1 | 10/2009 | Dodd | |
| 2012/0057775 A1* | 3/2012 | Suzuki | H04N 5/76 |
| | | | 382/154 |
| 2013/0050581 A1* | 2/2013 | Deshpande | H04N 5/247 |
| | | | 348/705 |
| 2013/0051763 A1 | 2/2013 | Gong | |
| 2013/0177252 A1 | 7/2013 | Hefeeda et al. | |
| 2013/0222601 A1* | 8/2013 | Engstrom | G11B 27/034 |
| | | | 348/159 |
| 2015/0085132 A1* | 3/2015 | Bekiares | H04N 7/181 |
| | | | 348/159 |

FOREIGN PATENT DOCUMENTS

| | | |
|---|---|---|
| WO | 2007080133 A2 | 7/2007 |
| WO | 2008062145 A1 | 5/2008 |
| WO | 2009074710 A1 | 6/2009 |
| WO | 2012143596 A1 | 10/2012 |

OTHER PUBLICATIONS

Mikolajczyk, K., et al., "A performance evaluation of local descriptors." IEEE Transactions on Pattern Analysis and Machine Intelligence, vol. 27, No. 10, pp. 1615-1630. Oct. 2005.

Bloy, G. "Blind Camera Fingerprinting and Image Clustering." IEEE Transactions on Pattern Analysis and Machine Intelligence, vol. 30, No. 3, pp. 532-535. Mar. 2008.

Kim, C., et al., "Spatiotemporal Sequence Matching for Efficient Video Copy Detection." IEEE Transactions on Circuits and Systems for Video Technology, vol. 15, No. 1, pp. 127-132. Jan. 2005.

\* cited by examiner

Fig. 11

METHOD AND APPARATUS FOR IMAGE FRAME IDENTIFICATION AND VIDEO STREAM COMPARISON

BACKGROUND

Field

The present invention relates generally to the field of image processing and, more particularly, relates generally to a method and apparatus for use in identifying image frames and for comparing video streams.

Related Art

It is desired to identify individual image frames within a video image stream. Typically, timecodes are used to identify frames, wherein each image frame is associated with a corresponding coded time value appropriate to a time position of that image frame within the stream. As an example, the SMPTE timecode standards such as SMPTE 292M or SMPTE 424M are known in the art for commercial broadcast television and motion picture systems. These timecodes are typically used as part of the Serial Digital Interface (SDI) standards for professional broadcast and motion picture systems.

Several difficulties arise with the known timecode frame identification systems. For example, timecodes are not accurately preserved by some types of video editing equipment. The timecodes within one video stream may become unreliable, and mixing together video streams from a plurality of different sources may produce inconsistent timecodes in the combined video stream. The timecodes may become corrupted, and some equipment or transmission systems may even completely remove the timecodes from the video stream.

As another option, it is known to perform watermarking of images frames, i.e. adding a marker element which, typically, is not readily visible to the ordinary viewer. However, watermarking requires editing access to a video stream and intrusively alters the image content by adding the watermark.

It is further desired to accurately identify a given video image stream. In particular, it is desired to determine whether a current video stream has been observed previously or matches with video streams from other sources. However, the known image frame identification systems such as timecodes and watermarking fail to adequately address this difficulty, for the same reasons as noted above.

The example embodiments discussed herein address one or more of these difficulties of the related art. The example embodiments may address other problems as will be appreciated by the skilled person from understanding the teachings herein. In one example, it is desired to provided a method and apparatus for identify image frames within a video stream.

SUMMARY

According to the present invention there is provided an apparatus and method as set forth in the appended claims. Other features of the invention will be apparent from the dependent claims, and the description which follows.

In one example there is described an apparatus for use in identifying image frames in a video stream, comprising: a digest value producing unit having circuitry configured to receive a plurality of first video streams comprising a plurality of first image frames, examine each said first video stream to produce a respective first digest stream comprising a plurality of first digest values, each of the first digest values being associated with a respective one of the plurality of first image frames, and to record the first digest streams in a digest record on a tangible storage medium; and a digest value matching unit having circuitry configured to examine at least one second image frame of a candidate second video stream to produce a respective second digest value, compare the second digest value against the plurality of first digest values in the digest record, and output a comparison result indicating a match between the candidate second video stream and a respective one of the plurality of first video streams.

In one example there is described a method implemented by a computer device for identifying image frames and comparing video streams, the method comprising: receiving a plurality of first video streams from each of a plurality of first video sources, each of the first video streams comprising a plurality of image frames; examining each of the first video streams to produce a first digest stream for each said first video stream, each said first digest stream comprising a plurality of first digest values, each said first digest value being associated with a respective one of the plurality of image frames; recording the plurality of first digest streams in a digest record; receiving a candidate second video stream; examining the candidate second video stream to produce a respective second digest stream comprising second digest values; comparing the second digest values of the second digest stream against the plurality of first digest values of the first digest streams in the digest record; and outputting a comparison result when the comparing indicates a match between the candidate second video stream and a respective one of the plurality of first video streams according to the respective first and second digest values.

In one example there is provided a tangible non-transient computer readable medium having recorded thereon instructions which when executed cause a computer to perform the steps of any of the methods defined herein.

BRIEF DESCRIPTION OF THE DRAWINGS

For a better understanding of the invention, and to show how embodiments of the same may be carried into effect, reference will now be made, by way of example, to the accompanying drawings in which.

DESCRIPTION OF EXAMPLE EMBODIMENTS

The example embodiments will be described with reference to a content replacement system, which may be used to replace content within television video images. In one example, the system is arranged to provide photo-realistic replacement of a billboard for live television broadcasts. However, the methods and apparatus described herein may be applied in many other specific implementations, which may involve other forms of video images or relate to other subject images of interest, as will be apparent to persons skilled in the art from the teachings herein.

The example embodiments discussed herein are particularly relevant to a system which performs dynamic image manipulation as described, for example in publications WO2001/58147 (Rantalainen), WO2009/074710 (Rantalainen), and WO2012/143,596 (Suontama). These documents may be consulted for further background information and the content therein may be useful when considering the following detailed description.

Briefly, WO2001/58147 concerns a method for modifying television video images, wherein a billboard or other visible object is identified with non-visible electromagnetic radiation, such as infra-red light. WO2009/074710 describes a method for modifying television video images by determining a shared area where the intended target area is overlapped by added graphics (e.g. graphics overlays) with a predetermined graphics percentage of coverage and substitute content is added according to the residual percentage of coverage not covered by the added graphics. WO2012/143,596 describes a method of detecting graphics elements, if any, which have been added at any given time in frames of a video signal.

In one example there is described a method for identifying image frames in a video stream, comprising: receiving a first video stream comprising a first plurality of image frames; examining the first video stream to produce a first digest stream comprising a plurality of first digest values, each of the first digest values being associated with a respective one of the first plurality of image frames; and recording the first digest stream in a digest record.

In one example, the method includes: examining at least one second image frame of a second video stream to produce a respective second digest value; comparing the second digest value against the plurality of first digest values in the digest record; and outputting a comparison result indicating a comparison result between the second image frame and the respective one of the first plurality of image frames according to the compared digest values.

In one example, the method includes: recording digest values in the digest record for each of a plurality of video streams; comparing a digest value from a candidate video stream against the recorded digest values; and outputting a comparison result. The comparison result may indicate that a matching one of the plurality of video streams has been found. The comparison result may indicate that no match has been found amongst the compared video streams.

In one example the first digest stream is recorded separately from the first video stream. The method may include transmitting the first video stream from a source location to a destination location by a first communication channel, and transmitting the first digest stream to the destination location by a second communication channel. The method may include synchronising an auxiliary video stream with the first video stream using the first digest stream.

In one example, the method includes: comparing a sequence of digest values obtained from a candidate video stream against respective sequences of the digest values in the digest record; and outputting a comparison result indicating a match between the candidate video stream and a respective sequence of image frames in the first video stream.

In one example, the method includes: calculating a distance between a candidate digest value and one or more of the digest values in the digest record, and selecting a match according to the calculated distance.

In one example, a match is determined by inexactly matching the digest values within a tolerance threshold. In one example, the match is determined by a nearest neighbour ratio threshold between two or more closest candidates from the digest record.

In one example, obtaining the digest value comprises: examining a plurality of sample groups of pixel values to provide numerical sample values, and performing a dimension reduction on the sample values to provide the digest value.

In one example, the method includes: extracting noise features from the image frame, and performing a dimension reduction on the extracted noise features to provide the digest value.

In one example, a method is described which includes: filtering an original image to provide a noise filtered image; subtracting the original image from the noise filtered image to provide a noise residual image; sampling pixel values from the noise residual image to provide a plurality of sample values; and performing a dimension reduction to obtain the digest value from the plurality of sample values.

In one example there is described a method for use in a process of identifying an image frame, comprising: obtaining a digest value from pixel data of the image frame; and recording the digest value in a digest record associated with the image frame.

The method may include obtaining the digest value from each of a series of image frames, respectively. In one example, each image digest is obtained by extracting a group of pixel values from the image frame and deriving the image digest value from the extracted group of pixel values. The extracted group may be a sub-group, less than a total number of pixel values in the image frame. The extracted group may contain pixel values which are distributed over an area of the image frame. The extracted pixel values may be non-contiguous, being derived from positions within the image frame which are not adjacent to each other. In one example, sampling a greater quantity of pixels in each sample group increases a probability of detecting or identifying the image uniquely, but may take longer. Thus, the method may be adapted to select an appropriate number of pixel values in each sample group. Each sample group may, for example, sample all of the pixels in an image, a sub-group of the pixels, or only relatively few pixels.

In one example, the sampling is repeated a plurality of times within the image frame. A sample value may be obtained from each sample group to provide a plurality of sample values. The image digest value may be derived from the plurality of sample values.

The digest is suitably a number array, i.e. an array comprising a list of number values, wherein each number value is derived by sampling a sub-portion of the image. Generally, the size of the array is suitably N values, where N is a positive integer. Each value may have a relatively large quantum, and/or may be floating point numbers. In one example, a dimension reduction process reduces each number value of the number array to a relatively short bit string (such as 8 bits or less, and to just one bit in some examples) to provide a binary byte array of predetermined length. In one example, the method includes examining a respective extracted sample group of pixel values to provide a numerical sample value, and then performing a dimension reduction on the sample value to provide a respective group of one or more bits of the byte array.

In one aspect there is described a method for identifying an image frame, comprising: obtaining a first image digest value from a first image frame; obtaining a second image digest value from a second image frame; calculating a distance between the first image digest value and the second image digest value; and outputting an image comparison result according to the distance.

In one example, the distance is a distance in an image space. In one example, the distance is a metric of a visual difference between the two respective images. In one example, the distance is a hamming distance of the first and second digest values (e.g. a count of the number of different bits in the digest bit vectors). Many other distance calculations are applicable in the example embodiments.

In one example, the image digests are obtained having a value which is proportional to the pixel values of the image frame. Thus, two images which are the same contain equivalent pixel values in equivalent positions within the image. In which case, the digest value obtained from those two image frames is the same. Likewise, images which are substantially similar will have substantially similar image digest values. By contrast, two images which are not similar will have a relatively larger distance between their respective digest values.

The digest mechanisms described herein allows an image digest to be produced as an identifier for each image. In one example, each digest is unique to the corresponding image. Two images which are visually similar produce relatively similar image digest values, and a difference or distance between the two image digests is relatively small. Meanwhile, images which are visually relatively different (i.e. contain many pixel values which are not correlated with the respective pixels of the other image) produce digests which are likewise uncorrelated.

In one example, the image digests are based on noise within the image. A noise signal is separated from the original visual content of the image. Thus, even visually very similar images (such as a static camera shot of a static landscape) can have recognisably different digests for each image frame. In example embodiments, suitable feature extractors of image filters find 'interesting' parts of the image which give unique digest value as an identifier of each image.

The example digest mechanisms are both powerful and flexible. Many factors can be varied within the method to suit each particular practical implementation. A number of pixels in each sample can be varied. The number of samples may be varied. The length of the digest may be varied.

The example embodiments produced digest values which are relatively small, such as less than 1 Kb in size. Advantageously, such digest values are easily carried in metadata alongside an image stream. The example embodiments have high performance and relatively lightweight computational impact. The example embodiments allow image digest to be calculated for high definition images in real time. That is, a video stream produces images at a frame rate of say 60 or 120 frames per second, and the example method is able to derive the image digests for each frame while maintaining throughput of the video stream. Notably, the time taken to calculate each image digest is much less than the time period of one image frame.

The example embodiments are relatively robust. The example image digest values are well suited for transmission across high-speed networks, such as the Internet. Further, the digest mechanism described herein produces well-correlated digest values even though the image frame has been transformed such as by compression, filtering other visual enhancements. That is, an original image frame produces a first digest value, and the same image frame after a transformation, such as compression/decompression or filtering, produces a second digest value, wherein the first and second digest values are relatively well correlated.

In one example, the image digests are well suited for use in detecting changes to an image frame, or a sequence of image frames. That is, the image digests are well adapted for use in detecting that images have been manipulated in some way, such as by applying an image transformation, or by changing the image content (e.g. adding or removing a graphics layer).

Many different specific schemes can be used, in the example embodiments, in order to generate the digest values. However, it has been found that some particular example digest schemes, as discussed herein, provide significantly improved results.

Figure 1:
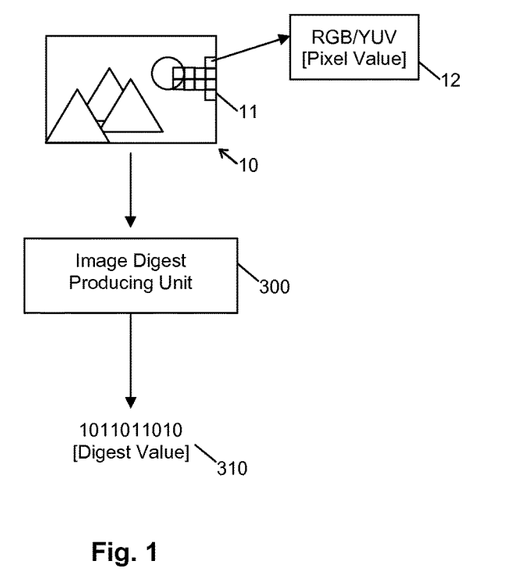
FIG. 1 is a schematic view of an example apparatus for identifying an image.

FIG. 1 is a schematic view of an example apparatus for identifying an image frame in a video stream. A digest value producing unit 300 is arranged to examine an image frame 10 and to produce a digest value 310. In the example embodiments, the digest value 310 is unique to the respective image frame 10. Thus, the digest value 310 summarises the image content of the respective image frame 10.

In one example, the digest values are derived such that another image having substantially the same image content produces a substantially equal digest value. By contrast, image frames having uncorrelated image contents produce digests that are widely different. Advantageously, in the example embodiments, there is a relatively low probability that two random image frames will have equal digest values, i.e. there is a very low probability of false matching.

In the example embodiments, a digest provides a one-way function which derives a (relatively small) representative numerical value from a (relatively large) input dataset. The one-way function does not allow the original dataset to be recreated from the digest. The digest is a repeatable function, in that the same input dataset will always produce the same output digest value.

As shown in FIG. 1, the example image frame 10 comprises pixels 11 each having a respective pixel value 12. As an example, a full high definition television image comprises 1920×1080 pixels, or about 2.1 million pixels in total. Each pixel value may comprise 24 bits or more bits of data (e.g. three or more channels of RGB data, YUV data, or similar). The digest value 310 for the image frame 10 meanwhile has a size of about 1 Kb (1024 bits), as an example. However, the example embodiments may be applied to any suitable image format to provide an image digest of any desired length (size).

Figure 2:
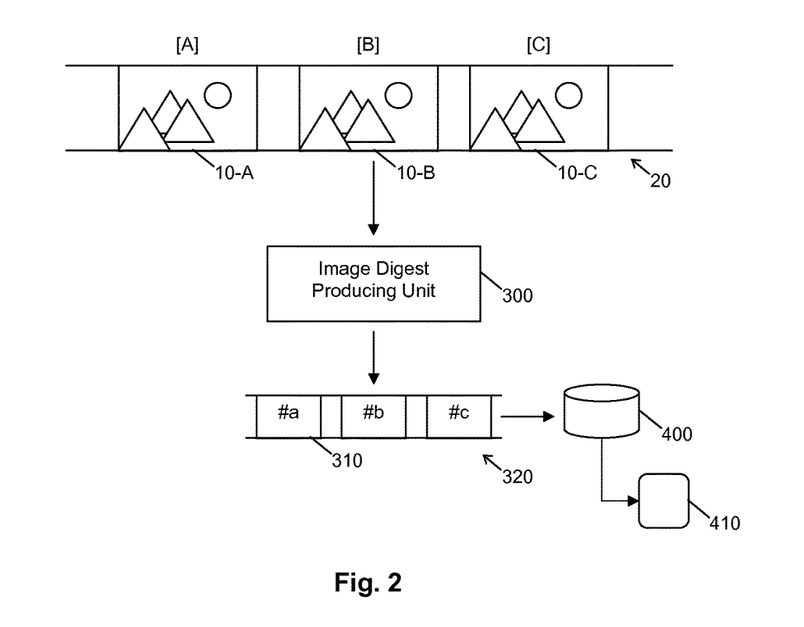
FIG. 2 is a schematic view of another example apparatus for identifying an image.

FIG. 2 is a schematic view of an example apparatus for identifying an image, wherein the digest value producing unit 300 examines each image frame 10 within a video image stream 20. Suitably, the image frames 10 are examined individually in turn. As one example, the video image stream 20 is provided in the format of a raw video image stream wherein each image frame 10 comprises an uncompressed still image. The image frames may be provided, for example, at 25 frames per second. As one example, the video stream 20 is provided in a Serial Digital Interface (SDI) format as will be familiar to those skilled in the art.

In this embodiment, the digest value producing unit 300 produces a sequence of digest values 310, wherein each digest value 310 corresponds to a respective one of the image frames 10. Thus image frames A, B, C in turn provide respective digest values #a, #b and #c. Suitably, the digest values 310 are gathered together sequentially in a digest value stream 320. In one example, the digest values are recorded in a digest value storage unit 400. Any suitable form of persistent, non-volatile storage, such as a hard disc drive or solid state memory, may be used as the digest value storage unit in example embodiments. Advantageously, the digest values can be carried as metadata associated with the video stream 20. Notably, however, the digest stream 320 can be recorded separately from the video stream 20. The digest stream 320 can be transmitted or carried to another location separately from transmitting or carrying the video stream 20. Thus, in example embodiments, it is not necessary to integrate the digest stream 320 directly with the video stream 20. However in other example embodiments, the digest stream 320 can indeed be combined with the video stream 20 when it is convenient to do so.

Suitably, the digest values 310 are recorded in digest record or database 410 held on the storage unit 400. The digest database may be an indexed database. For example, each entry of the index comprises a sequential index number, such as a number of frames from an appropriate starting point, and a corresponding digest value. Thus, the index may identify frame number '1' as having the digest value '1235456789', frame number '2' as having the digest value '456789123', and so on. The digest database 410 may comprise digest values taken from a single video stream, or may be extended to include digest values relevant to multiple examined video streams.

Figure 3:
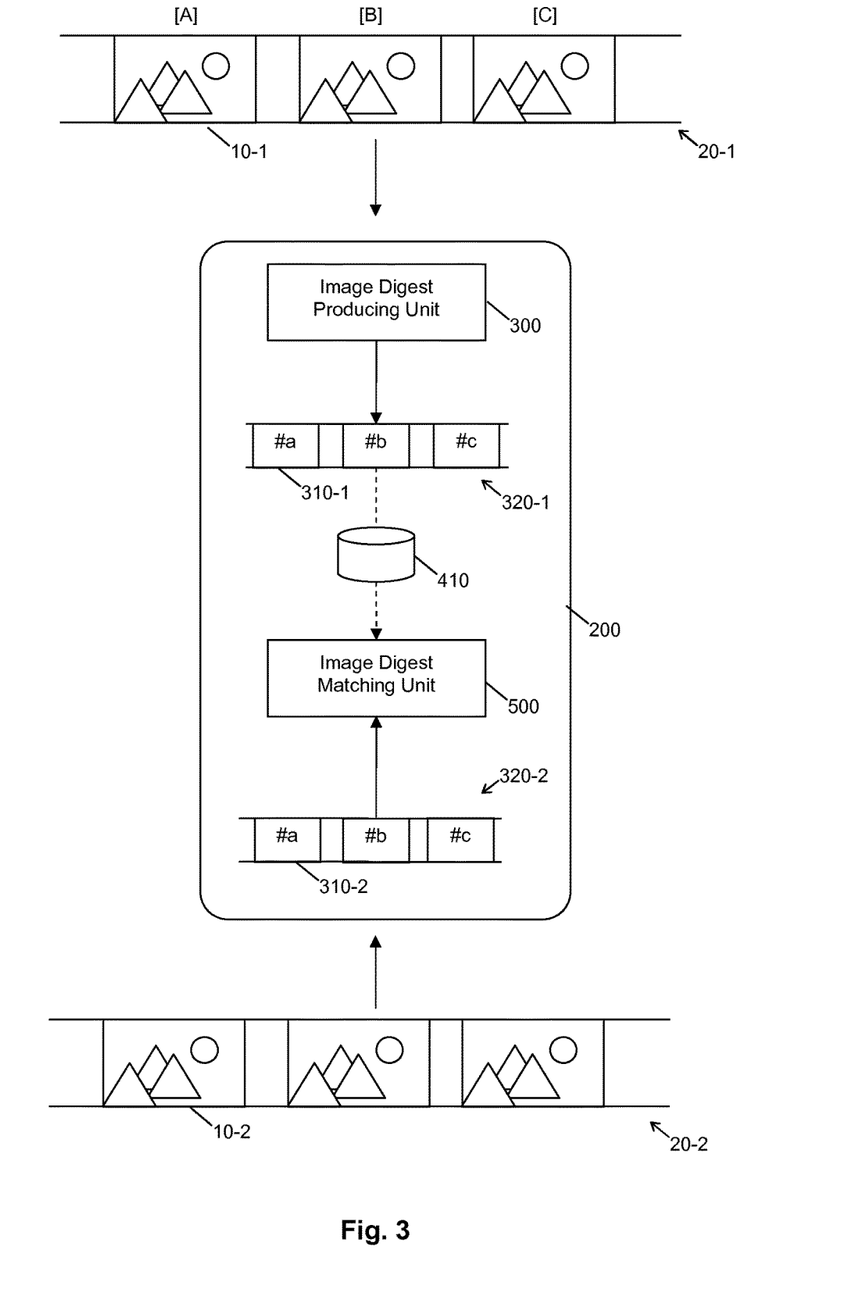
FIG. 3 is a schematic view of an example image frame identification system.

FIG. 3 is a schematic diagram of an image frame identification system, comprising the digest value producing unit 300 as noted above, and an image digest matching unit 500.

As discussed above, the example digest value producing unit 300 derives image digest values 310 from individual image frames, and may further produce the digest value stream 320. The image digest values 310 are derived from the respective image frames 10-A, 10-B, 10-C, and the digest value stream 320 comprises the sequence of individual digest values 310-1, etc.

In one example, a first image digest value 310-1 is calculated from an original image 10-1 by the image value producing unit 300 and is recorded. Later, a second image digest value 310-2 is calculated by the image digest matching unit 500 from another image 10-2 (e.g. possibly the same stored file, or a copy of the original file). The candidate image frame 10-2 can now be confidently identified (recognised) when the second image digest value 310-2 matches with the first image digest value 310-1 obtained and recorded previously. Thus, a currently unknown candidate image frame 10-2 can be compared against one or more known and previously indexed image frames 10-1 and recognised using their respective individual image digests 310-1 & 310-2. Conversely, the candidate image frame can be determined not to match any of the recorded digest values, indicating that this particular image frame has not been observed previously.

Further, in the example embodiments, a plurality of digest values in the second digest stream 320-2 obtained from the candidate second video stream 20-2 may be compared against corresponding sequences of digest values from the database 410, i.e. sequences or windows derived from the first digest stream 320-1 recorded earlier. Notably, for a corresponding sequence of image frames, the individual digest values 310 will follow the same pattern in both of the digest streams 320-1 and 320-2.

Thus, a candidate video stream 20-2 can be compared against one or more previously examined video streams 20-1 recorded in the digest database 410 and recognised or distinguished using the respective image digest values.

These example forms of image digest matching have many advantages, and many potential uses. The following example embodiments discuss various specific forms of identifying image frames, individually or in a video stream, using image digests.

In the example embodiments, a high value is achieved when images of a sporting event, such as a football or soccer match, are shown live to a large audience. The audience may be geographically diverse, e.g. worldwide, and hence it is desirable to create multiple different alternate broadcast feeds for supply to the broadcasting system to be delivered in different territories using local delivery broadcast stations, e.g. country by country or region by region. In a live event, the content replacement apparatus should operate reliably and efficiently, and should cause minimal delay.

In the example embodiments, the broadcast feed is to be modified by adding alternate content such as one or more still images (e.g. JPEG image files) and/or one or more moving images (e.g. MPEG motion picture files). As another example, the alternate content may comprise three-dimensional objects in a 3D interchange format, such as COLLADA, Wavefront (.OBJ) or Autodesk (.3DS) file formats, as will be familiar to those skilled in the art.

The alternate content is suitably prepared in advance and is recorded on a persistent storage medium coupled to the content replacement system. Thus, the content replacement system produces one or more output feeds where the observed subject of interest, such as a billboard, is replaced instead with the alternate content. Ideally, the images within the alternate feed should appear photo-realistic, in that the ordinary viewer normally would not notice that the subject has been electronically modified. Hence, it is important to accurately determine a masking area defining the position of the subject billboard within each video image. Also, it is important to identify accurately when portions of the observed subject have been obscured by an intervening object such as a player, referee, etc. Notably, the intervening object or objects may be fast-moving and may appear at different distances between the camera and the subject. Further, it is desirable to produce the alternate feed(s) containing the alternate content in a way which is more agreeable for the viewer, and which is less noticeable or obtrusive. Thus, latency and synchronisation need to be considered, as well as accuracy of image content manipulation.

As an example, a live sporting event is usually covered by a large number of individual cameras. For example, a soccer match may be covered by up to 30 individual cameras. A motor race may be covered by up to 80 individual cameras. Often, it is desired to identify or recognise images within a video image stream against a plurality of potential sources, such as identifying which camera is currently live on air.

Figure 4:
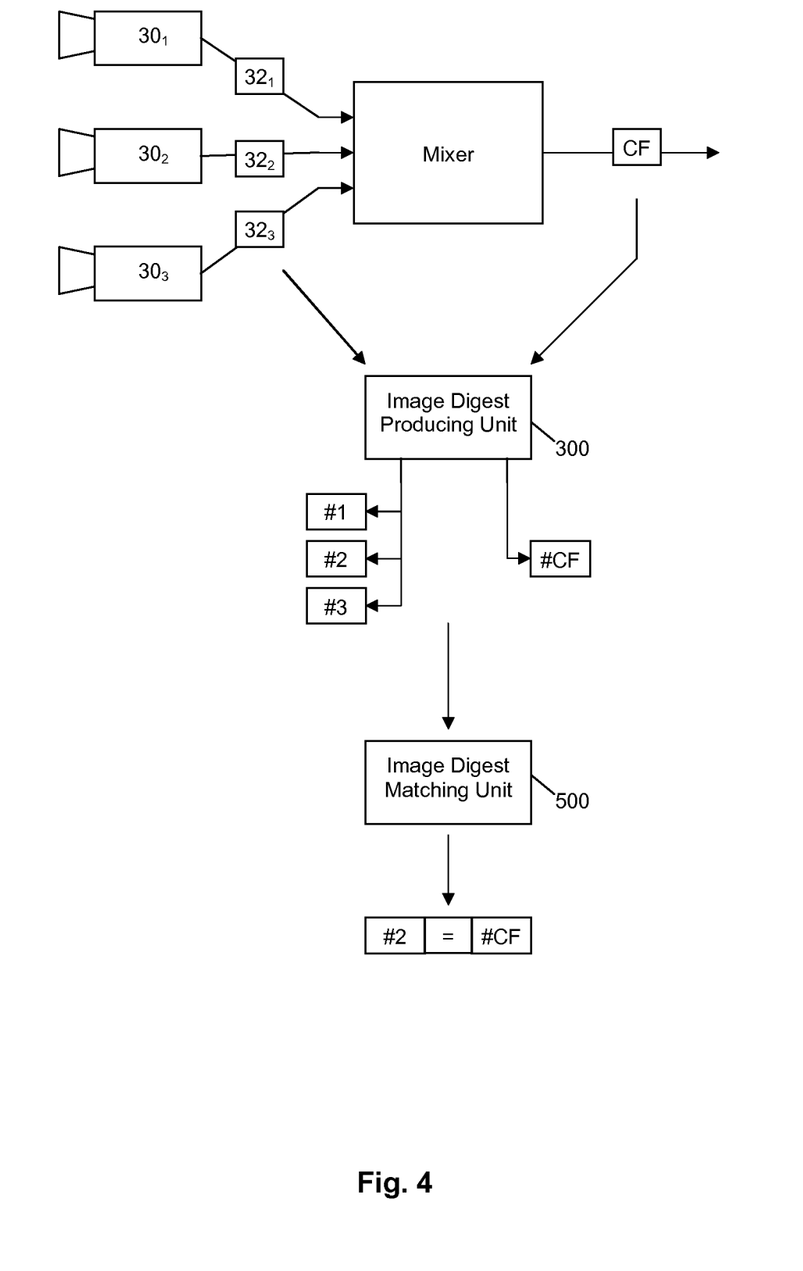
FIG. 4 is a schematic view of an example video processing system in which the example embodiments may be employed.

FIG. 4 is a schematic view of an example apparatus for image identification according to one example embodiment. In this example, an image digest matching unit 500 identifies which of a plurality of potential video image sources is currently active, and in this case identifies which of the available camera streams is currently live on air.

FIG. 4 shows a simplified example embodiment wherein a plurality of image sources 30 (e.g. cameras) provide respective input feeds 32 to a mixer 40. The mixer 40, amongst other operations, may select a camera feed 32 to be used currently live on air in a clean feed 42. As one example, the mixer 40 is a video production switcher appropriate for broadcast television environments. An example would be a KAYAK™ video switcher available from Grass Valley USA LLC of San Francisco, Calif., USA.

In this example, the three cameras $30_1$-$30_3$ produce respective camera feeds $32_1$-$32_3$, one of which will be chosen by the mixer 40 to be currently live on air. The image digest matching unit 500 compares the camera feeds $32_1$-$32_3$ with the clean feed 42, thus determining which one of the camera feeds is currently being used by the mixer 40 live on air.

In one example embodiment, a plurality of mask signals are prepared respectively from the camera feeds $32_1$-$32_3$, and one of the mask signals is selected at any one time to be applied to the clean feed 42. Hence, determining the current on-air camera allows the correct mask signal to be selected.

The image digest matching unit 500 suitably includes or is coupled to an image digest producing unit 300 as discussed above, which produces camera feed digest streams #1, #2, #3 from each of the plurality of camera streams respectively, into a suitable digest database 410. The image digest matching unit 500 determines the camera which is currently on air by comparing and matching the clean feed image digest #CF against the camera feed image digests #1, #2 or #3.

It will be appreciated that practical implementations are often more complex than this explanatory example. For example, the mixer 40 may perform one or more image processing steps, beyond simply selecting one of the camera feeds. The mixer 40 may, for example, perform colour correction, value legalisation, clipping (e.g. super-white or super-black clipping) and so on. The mixer may cause a line drop, wherein the image is moved down by one or more lines. Other mixer artefacts may be introduced. The mixer may introduce noise. Thus, the digest values in the clean feed digest #CF often will not exactly match any of the camera digest #1, #2, #3. Therefore, the example embodiments advantageously allow an inexact match to be determined.

In one example, digest matching can still be achieved even if the relevant image has undergone image processing as discussed above. Even if the individual pixel values are changed slightly by the image processing, the image content is still substantially the same. Advantageously, this similar image content produces substantially the same digest value. A nearest neighbour ratio (NNR) may be used as a threshold. Thus the image digest matching unit 500 may find the two closest matches amongst the plurality of candidate images (i.e. the camera feeds in this example), compared with the target image (i.e. the clean feed image). Where the second closest match is more that twice the distance than the first match, then the first match can be considered as a correct match. This NNR threshold advantageously allows matches to be determined with a high probability of accuracy. However, other schemes can be employed for determining whether or not an adequate match has been achieved. In one example, it is to be assumed that the target image will match at least one of the candidate images, because the clean feed has been derived from at least one of the camera images at any particular point in time. Conversely, the observed image frame can be determined not to match any of the recorded digest values, indicating that this particular image frame has been modified beyond recognition or comes from another unrecognised source and thus does not match against any of the available comparison images.

The embodiment of FIG. 4 can also be employed for static image matching, i.e. comparing one candidate image against a plurality of previously examined library images, or vice versa. Hence, it will be apparent that this image matching mechanism using image digests is a powerful and widely applicable technique. Further advantages are derived, as discussed above, when this technique is employed specifically in the context shown in FIG. 4 relating to image switching between multiple sources.

Notably, the example embodiments do not require any modification or interference with the ordinary operation of the mixer 40. Thus, the mixer 40 operates as normal. The image matching process is applied non-invasively simply by monitoring the relevant input and outputs of the image mixing equipment. This non-invasive functionality is very important in many practical circumstances.

Figure 5:
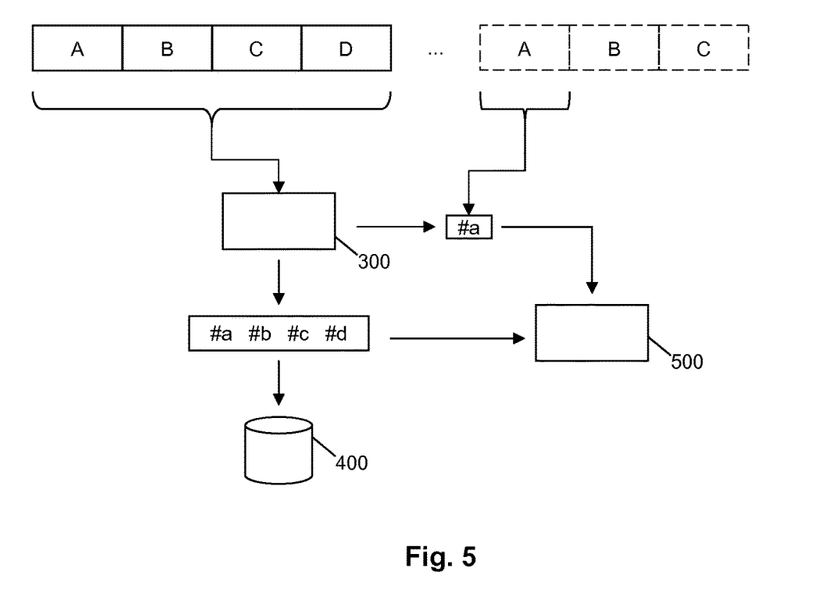
FIG. 5 is a schematic view of another example video processing system in which the example embodiments may be employed.

FIG. 5 is a schematic view of an example apparatus for image recognition according to one embodiment. Generally, the digest value of a current image frame is compared against digest values of library image frames from one or more previously observed video image streams. Likewise, a group of neighboring image frames (i.e. a short video sequence) may be used for the searching and matching. In this example, the image digest matching unit 500 identifies a replay or delay event.

As shown in FIG. 5, an image stream containing sequential images A, B, C, D is examined. The image digest producing unit 300 creates digest values #a, #b, #c, #d for each of these image frames and stores the digests in a suitable data buffer, repository or library 400. The image digest producing unit 300 likewise obtains the image digest of a respective current image frame. Noting that image A is currently output and that image A has already been examined previously, the image digest matching unit 500 may now indicate, when appropriate, that a previously examined image frame has been found.

This embodiment is particularly useful for detecting a replay event, wherein live coverage of sports action is temporarily suspended and an important or interesting event is replayed again for the viewers. For example, the library 400 is populated by observing the clean feed images output from the mixer 40, and each new image digest is compared against the previously stored digests to look for repetitions of the same (or substantially the same) image frames as seen some time previously. Advantageously, downstream equipment may now provide improved image content manipulation, such as for dynamic content replacement, e.g. by applying a masking signal which is appropriate to the detected previously observed image frame or frames.

Further, referring again to FIG. 4, the library 400 may be populated by digest values from each of the observed camera image streams $32_1$-$32_3$ input to the mixer 40. Here, a delay event may occur wherein a short sequence from a previously unused camera feed is inserted into the clean feed CF, so as to give the viewer a different angle of view of an already observed event. For example, a key event in the live action was originally taken from camera 1 on air, while the delayed replay uses camera 2 instead. By observing and recording digests for each of the relevant image streams $32_1$-$32_3$ into the library 400, the matching unit 500 may now quickly and efficiently compare a current image frame digest value against the digest values from each of the previously observed image streams. In example embodiments, a previously prepared appropriate masking signal may then be selected and applied to the recognised image stream.

In one example, the matching unit 500 first attempts to match the current frame against the available live image sources (live camera feeds) and then secondly attempts to match against previously observed image sources (recorded or delayed image feeds), e.g. getting progressively older in time, until an appropriate digest match is found. The appropriate masking signal may then be selected and applied to the current image frame, for improved dynamic content replacement. If no match is found then a failsafe option can be applied, such as outputting the received images without any dynamic manipulation. The viewer thus always sees a suitable image stream.

The example embodiments are also useful for synchronising separate items of video processing equipment. For example, the system obtains the image sequence of FIG. 5 by observing both the inputs and outputs of the mixer 40 of FIG. 4 described above. The image digest matching unit 500 may compare the candidate images from the mixer output against the previously observed images at the input, thus allowing a non-invasive measurement of frame delay within the mixer 40. For example, observing that frame D is currently input while frame B is output indicates a two-frame delay in the mixer 40.

That is, the candidate image is compared against a sequence of known images which are sequential in time to determine the relevant match amongst those images. Notably, for a particular video image feed, it is to be expected that temporally adjacent images will be visually substantially similar and thus it is relatively difficult to visually detect minor differences between the respective images. In one example, matching may be achieved by looking for abrupt scene changes (cut points) within the video stream of interest. In another example, accurate matching, even amongst seemingly identical images, is achieved by considering the noise artefacts which are unique to each of those images.

Figure 6:
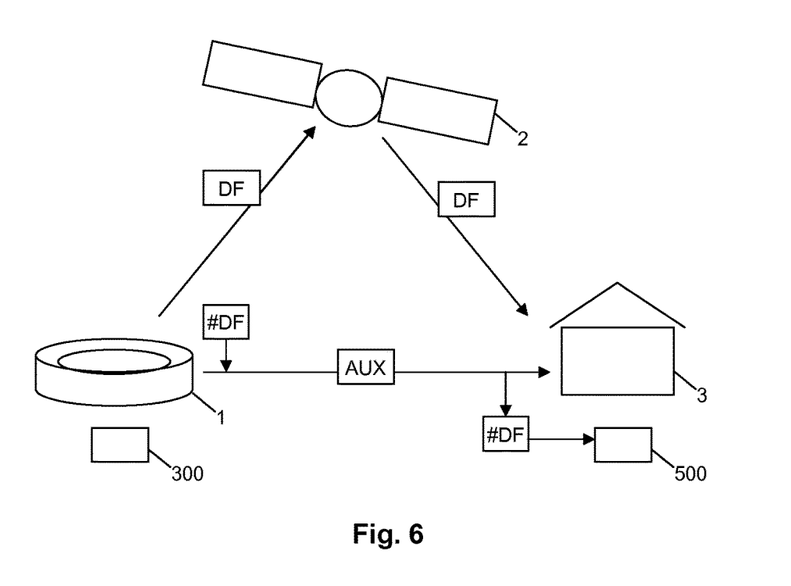
FIG. 6 is a schematic view of an example broadcast transmission system in which the example embodiments may be employed.

FIG. 6 is a schematic view of a further example embodiment wherein image digest matching is performed at a location remote from creation of the image digest values.

As shown in FIG. 6, images are captured and processed at a first location, such as a sports stadium 1. A broadcast feed (dirty feed) is created as will be familiar to those skilled in the art, capturing the live sport action from various cameras around the stadium. Graphics and logos (current score, player statistics and so on) may be overlaid onto the clean feed images to produce the dirty feed. The dirty feed DF is then transmitted by any suitable transmission channel 2 to a remote location 3. In this example the dirty feed is uploaded to a satellite and downcast to broadcasting equipment at the remote location 3 for onward transmission to local viewers and subscribers.

In this example, it is desired to perform dynamic image manipulation at the remote location 3 using an auxiliary image signal AUX which is provided in a separately transmitted auxiliary signal stream. The auxiliary stream may use substantially the same communication channel as the dirty feed (i.e. being carried as another image stream by the same satellite or fibre communication channel 2) or may use another completely separate and distinct transmission channel (e.g. the Internet). Conveniently, the auxiliary stream carries a masking signal which identifies portions of the dirty feed images which are to be electronically replaced or substituted with alternate content.

A difficulty arises in accurately synchronising the masking information of the auxiliary signal stream AUX with the separately transmitted image stream of the dirty feed DF. In particular, the image streams may have different transmission delays, and these delays may vary during a single broadcast session or live event. However, the example embodiments address this difficulty using the image digest and image matching techniques discussed herein.

As shown in FIG. 6, a digest unit 300 creates an image digest of the dirty feed at the transmitting station, in this case the stadium 1, prior to transmission of the dirty feed. Thus, the digest stream #DF can be synchronised both with the dirty feed and with the relevant images of the auxiliary stream. Conveniently, these image digests #DF can be carried as part of the auxiliary stream AUX. Notably, the dirty feed stream DF is not altered at all in any way. Again, this non-invasive process is important in many practical situations.

Meanwhile, an image digest matching unit 500 at the remote location 3 compares the currently received images of the transmitted dirty feed DF with the image digest #DF prepared earlier and transmitted here as part of the auxiliary stream AUX. Thus, the currently available portion of the dirty feed image stream is identified and the masking signal of the auxiliary stream is synchronised the dirty feed image stream. The image content replacement process may then continue as known in the art. Advantageously, synchronisation between the separately transmitted streams is achieved quickly, efficiently and reliably.

Many different specific schemes can be used, in the example embodiments, in order to generate the digest values. However, it has been found that some particular example digest schemes provide significantly improved results.

Figure 7:
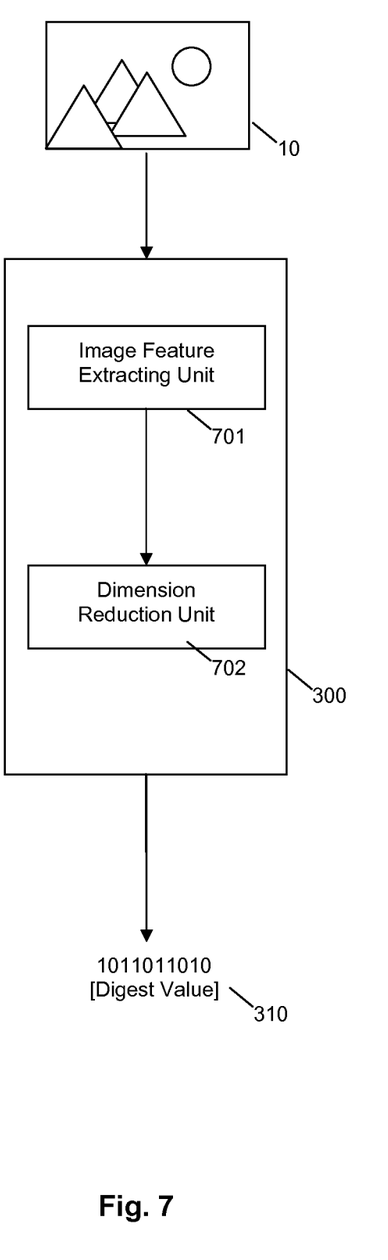
FIG. 7 is a schematic view of an example apparatus for identifying an image.

FIG. 7 is a schematic view of an example embodiment of the image digest value producing unit 300, comprising a feature extraction unit 701 and a dimension reduction unit 702.

The feature extraction unit 701 extracts relevant features from the image 10 under consideration. In one example, the features extracted are based on the pixel values 12 of a plurality of sampled pixels 11 within the image 10. In one example, the features are based directly on the numerical pixel values (e.g. the R,G,B colour value or YUV values). In another example, the extracted features isolate noise artefacts within the image 10.

The dimension reduction unit 702 reduces the quantity of data obtained by the feature extraction unit 701 in order to produce the digest value 310 of a desired size or length. Generally, the dimension reduction reduces the original data from a high dimensional space to a lower dimensional space. For example, a linear projection may be applied to perform dimension reduction. Dimension reduction generally applies a function $F(X) \rightarrow Y$, where function F maps a high dimensional vector X to a low dimensional vector Y. The example embodiments select the function F that is easy to compute, but also maintains distances, so that if point X1 and X2 are far away in high dimensional space, then low dimensional points F(X1) and F(X2) should still be far away from each other with high probability. Conversely, if points X1, X2 are close to each other in the high dimensional space then should F(X1) and F(X2) will also be relatively close in the low dimension.

Figure 8:
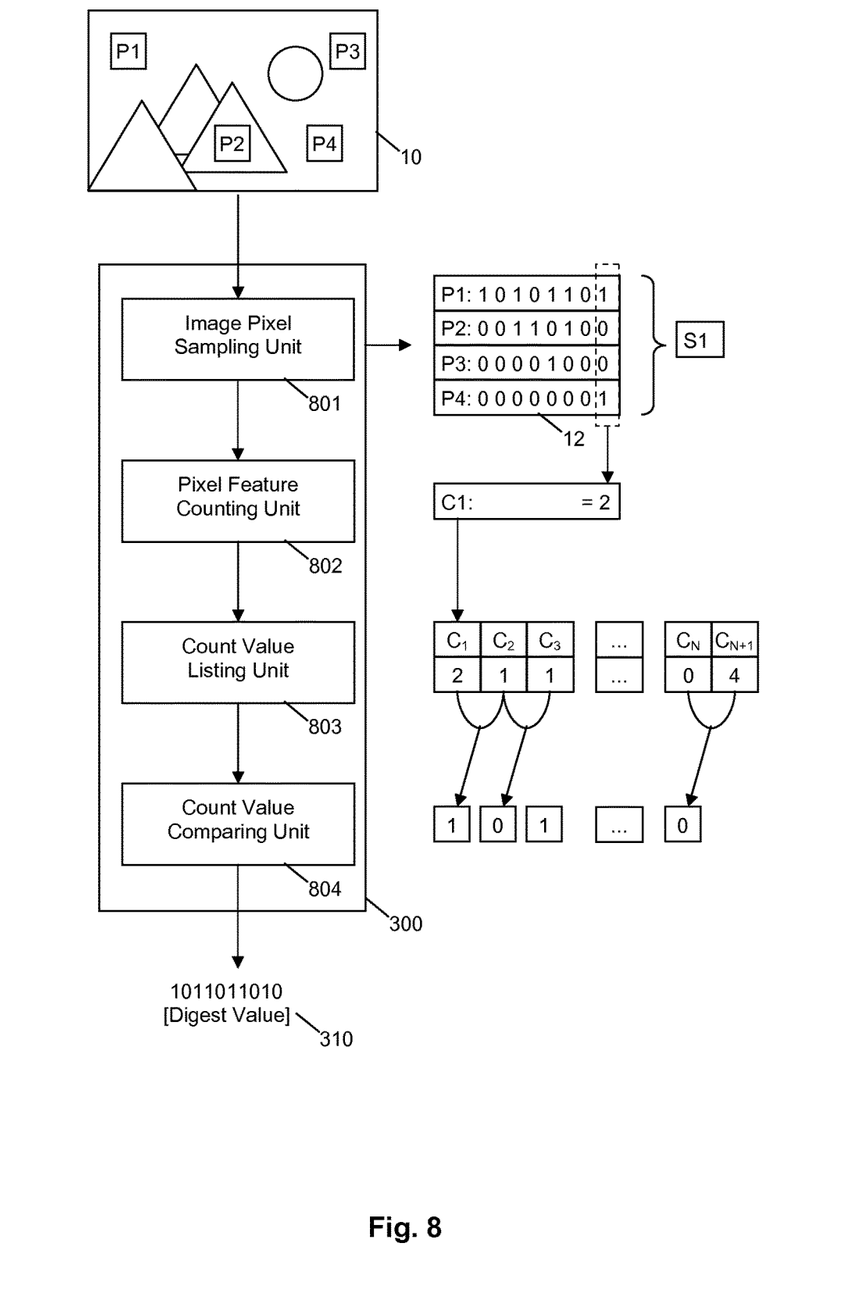
FIG. 8 is a schematic view of an example apparatus for identifying an image.

FIG. 8 is a schematic diagram showing one example embodiment of the image digest producing apparatus in more detail. In this example, the digest value producing unit 300 includes a pixel value sampling unit 801, a pixel feature counting unit 802, a count value listing unit 803 and a count value comparing unit 804.

The sampling unit 801 is configured to select a subgroup of pixels within the respective image frame 10 according to a predetermined sampling pattern. A plurality of sampling patterns may be defined in advance and are suitably applied in a pre-determined sampling sequence. Alternately, the sampling pattern can be randomly selected amongst the predefined group and the sampling pattern recorded relevant to the produced digest value 310. These implementation details can be practiced according to the specific environment at implementation, i.e. depending on the images being examined, the type of transmission system involved for transmission of the image digest, storage space, bandwidth and so on.

In the simplified example of FIG. 7, the sampling unit 801 applies a sampling pattern which selects pixels P1, P2, P3 and P4 from the image frame 10 and thus obtains respective pixel values 12 for each of the sampled pixels in the sampling group S1. The pixels P1-P4 are not shown to scale.

The pixel feature counting unit 802 counts a selected feature of each of the sampled pixel values P1-P4. In one example, it is desired to count the least significant bit (LSB) of each pixel value 12. In the example embodiments, each sampling group contains say 1024 pixels amongst say 2.1 million pixels of the full image frame. Conveniently the sampled pixels are spread out over the image area. The distribution pattern of the sampled pixels may be random or quasi-random, intended to produce a relatively even distribution. Alternatively, the sampled pixels may be deliberately clustered in areas which are known to be of interest for the images in question. Sample pattern training may be performed in order to learn sample patterns which produce optimal results for the image frames in question. Thus, wide-angled shots of a sports stadium or outdoor event may obtain better results with one type of distribution pattern, whereas close-up shots of players in action, or commentators in a studio, may perform better with other types of sampling pattern.

The pixel feature counting unit 802 suitably counts the least significant bit from the sampled pixel values, because this bit is most sensitive to changes within image content. Equally, other embodiments might count the second-most least significant bit, such as where slightly less image sensitivity is required. The counting unit 304 produces a count value C1 according to the number occurrences of the counted feature. In this example, the count value corresponds to the counted number of bits having the value "1".

The count value list unit 803 is arranged to store a list of each of the count values produced by the sampling unit 801 and counting unit 802 as described above. Suitably N+1 count values are obtained by repeatedly performing the sampling and counting steps, where N is a positive integer.

The count value comparing unit 804 compares respective pairs of count values in the list to derive one bit of the digest value 310. The comparison is useful in order to reduce the count values into individual bits of the image digest 310. For example, first member of the pair is compared against the second member of the pair. Where the first member of the pair is greater than the second, then the corresponding bit of the digest is set to the value "1" or else "zero" (or vice versa). The count value comparing unit 306 thus reduces the large number of pixel values of the counts in the list into a relatively small number of bits in the digest. This mechanism is relatively tolerant of small changes in image content, wherein relatively small changes of image content produce relatively small differences in the resulting digest value.

The example embodiment of FIG. 8 is effectively a histogram, being based on counting the number of, in this case, least significant bits. Thus the mechanism is referred to herein as "least significant bit (LSB) histogram". The relative frequency of the observed feature (least significant bit in this case) within each sample is proportional to the image content.

The LSB histogram mechanism is fast and efficient, with relatively low processing overhead (CPU time, memory consumption, etc.). Notably, where an original image goes through image transformations, such as translation (movement by a number of pixels a direction), sharpening, brightness, contrast, colour correction, etc., then the image digest produced by the LSB histogram mechanism will be significantly different compared with the corresponding digest value of the original image. Thus the LSB histogram mechanism is useful particularly in situations without such image transformations.

Figure 9:
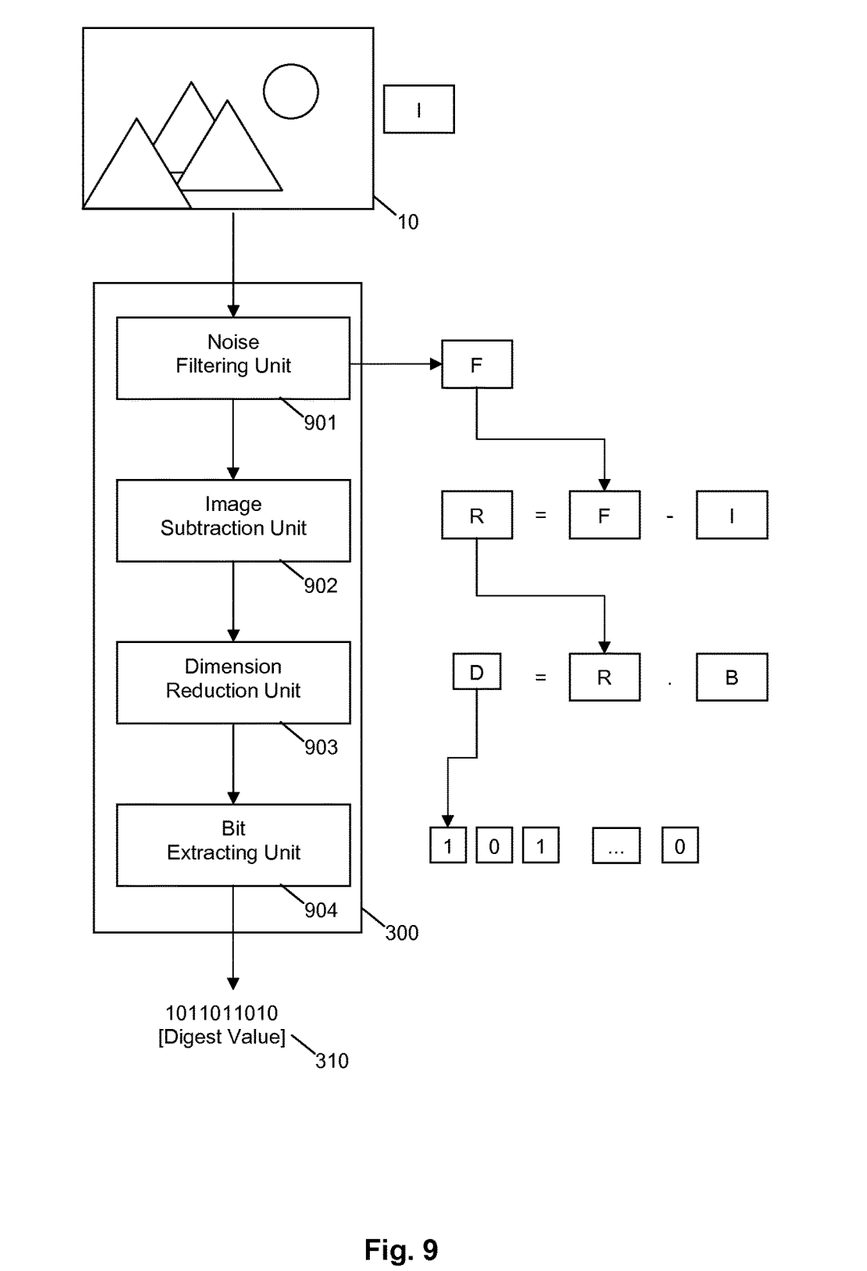
FIG. 9 is a schematic view of an example apparatus for identifying an image.

FIG. 9 is a schematic view of another example embodiment of an apparatus for identifying an image frame. In this example, the image digest value producing unit 300 produces the digest value by extracting noise features, comprising a noise filtering unit 901, an image subtraction unit 902, a dimension reduction unit 903, and a bit extracting unit 904.

Interestingly, image capture devices (such as a camera) and image processing devices (such as a mixer) may introduce noise into the image content of each image frame. The noise signal is unique to that image frame. Thus, even if a camera produces two consecutive image frames which observe exactly the same scene, the noise signal introduces slight differences between those two image frames. The noise signal thus becomes a recognisable trace artefact which, if extracted and observed, can be used to uniquely identify the relevant image frame.

The noise filtering unit 901 applies a noise filter to the original image 'I' to produce a noise filtered image 'F'. Any suitable noise filter may be employed. For example, good results have been observed using noise filters containing white noise patterns showing little or no correlation to the original image. High quality noise filtering has been observed to give better results. As one example, a noise filter using non-local means (NLM) has been observed to achieve good results. It is believed that the NLM filtering affects mostly flat low contrast image areas, while textured detailed areas are relatively unmodified. The noise signal is more noticeable in these flat low contrast image areas than in detailed textured areas and hence it is easier to isolate the noise signal in these areas.

The image subtraction unit 902 subtracts the noise filtered image F from the original image I to produce a residual image 'R'. The residual image R thus represents a difference between the original image I prior to noise filtering and the same image F after noise filtering, corresponding to the changes made to the original image by the noise filtering algorithm.

The dimension reduction unit 903 may be provided to reduce in size the residual image R. That is, the noise filtering is conveniently applied over an entire image area of the original image I to produce the noise filtered image F. The dimension reduction unit 305 then reduces the residual image R from the original size (e.g. 2.1 megapixels) to a smaller size more convenient for deriving the digest value. Suitably, the dimension reduction unit 305 applies a projection which projects the residual image R to a set of uncorrelated basis vectors 'B'. The basis vectors are suitably image size number sequences made by a pseudo-random generator. Desirably, the basis vectors are chosen to be relatively sparse and orthogonal, which accelerates computation. Conveniently most of the basis vectors are set to the value zero and a remainder are given the value of either +1 or −1. These non-zero residual value basis vectors are suitably distributed across the image area according to a distribution pattern. The basis vector distribution pattern may be varied or applied by a learning process, as discussed above for the pixel sampling pattern. The basis vector pattern thus allows all areas of the image, or selected areas of interest, to be examined as appropriate.

The dimension reduction unit 903 produces a digest vector 'D' by multiplying the basis vector matrix B with the pixel values of the residual image R. In this case, the residual image R can be considered as one long vector of the pixel values. The inner product of the residual image vector R and the basis vector B thus gives a projection of the residual image vector to the basis vector and the sign of that inner product gives a corresponding bit of the digest value.

The bit extracting unit 904 suitably extracts the bits of the digest values 310 as the sign of each value in the vector D. That is, adding and subtracting the residual pixel values together produces a resultant value having either a positive or negative sign. Where the sign of the resulting value is positive, then the digest bit is given the value "1" or else "0" (or vice versa).

Performing the above calculation multiple times produces the digest value 310 having the desired number of bits. In the example embodiments the digest value 310 conveniently has the size of 1024 bits.

Figure 10:
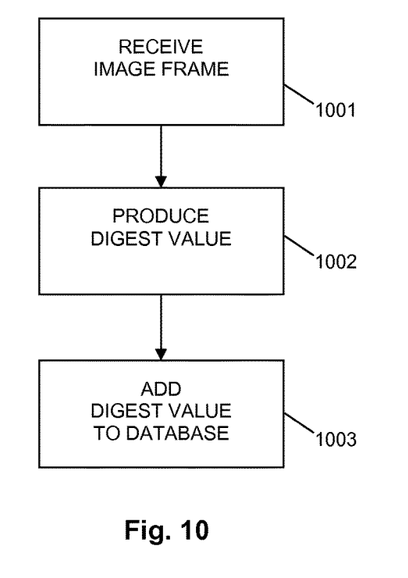
FIG. 10 is a schematic flowchart of an example method.

FIG. 10 shows an example method as may be performed by the apparatus and system discussed herein. Step 1001 comprises receiving a first video stream comprising a first plurality of image frames. Step 1002 comprises examining the first video stream to produce a first digest stream comprising a plurality of first digest values, each of the first digest values being associated with a respective one of the first plurality of image frames. Step 1003 comprises recording the first digest stream in a digest record.

Figure 11:
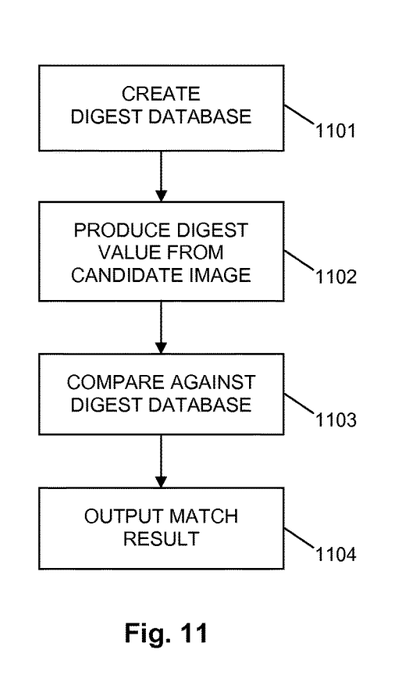
FIG. 11 is a schematic flowchart of another example method.

FIG. 11 shows another example method as may be performed by the apparatus and system discussed herein. Step 1101 comprises forming a digest record or database as discussed herein. The step 1101 may include recording digest values in the digest database for each of a plurality of video streams. Step 1102 comprises examining at least one second image frame of a second video stream to produce a respective second digest value. Step 1103 comprises comparing the second digest value against the plurality of first digest values in the digest database 410.

Step 1104 comprises outputting a comparison result indicating a match between the second image frame and the respective one of the first plurality of image frames. It is also possible that no adequate match is achieved, in which case a negative indication may be output. Step 1104 may include comparing a digest value from a candidate video stream against the recorded digest values in the digest database 410. Where digest values from many separate video streams are recorded in the database, the step 1104 may include outputting a comparison result indicating a respective one of the plurality of video streams which most closely matches with the candidate video stream.

In one example, a count value is obtained by counting any suitable significant feature of the sampled group of pixels. In one example the method includes examining at least one bit of each extracted pixel value and deriving a count value from the extracted bits. In one example a least significant bit of each pixel value is examined. In one example the count value is derived from a number of examined bits having a defined value, such as a count of the number of "one" or "zero" bits.

In one example the method includes recording the count values in a list. The method may include repeatedly extracting groups of pixels, examining one or more bits of each extracted pixel value, and performing the count for each of a plurality of recorded count values in the list, such that the list contains N+1 count values, where N is a positive integer.

In one example the image digest value is obtained by comparing selected count values from the list against each other. In one example, pairs of count values are compared with each other to derive a single bit of the image digest value. Each such comparison suitably sets one or more respective bits of the image digest to the values "1" or "0", depending on the result of the comparison. The comparison may compare whether one member of the pair is higher or lower than the other member of the pair. The pairs may be neighbouring count values in the list. In this way, N such comparisons derive N bit values of the image digest from the members of the list.

In one example, the method includes extracting noise features from an image frame, using a noise feature extraction process, and then performing a dimension reduction on the noise features to provide a digest value. In one example, a sample value is obtained according to the extracted noise features. The dimension reduction process produces a respective digest value relevant to this sample, or a respective part of the digest value relevant to this sample.

In one example, the image digest value is obtained by filtering an original image to provide a noise filtered image. The filtering is performed by a noise filter, such as a non-local means filter. A difference image or residual image is obtained by subtracting the original image from the noise filtered version (or vice versa). The residual image thus represents differences between the original image and the noise filtered version, equivalent to a noise signal. Thus, the example embodiments may obtain the residual image based on a noise signal detected in an original image.

Advantageously, image processing functions such as compression or filtering can reduce the original noise signal significantly, but tend not to remove the original noise signal completely. Thus, the residual noise digest mechanism discussed above tends to produce relatively similar digest values for a particular image even after that image undergoes some form of image processing to form a corresponding transformed image. The example embodiments have been observed to survive high quality jpeg compression of individual image frames, for example. Interestingly, images that are visually close to each other in very high dimensional image space are also close to each other in the subspace projection used by the residual noise digest mechanism discussed above. With suitable basis vectors, the low dimensional subspace has been found good enough to distinguish between different images from each other, whilst be fast and efficient.

The industrial application of the example embodiments will be clear from the discussion herein.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Although a few example embodiments have been shown and described, it will be appreciated by those skilled in the art that various changes and modifications might be made without departing from the scope of the invention, as defined in the appended claims.

The invention claimed is:

1. A method implemented by a computer device for identifying image frames and comparing video streams, the method comprising:
receiving a plurality of camera video streams from each of a plurality of cameras covering an event, and a candidate video feed formed by switching among the plurality of camera video streams, wherein a selected one of the plurality of camera video streams appears within the candidate video feed at any one time;
producing a digest record comprising a digest stream for each of said camera video streams, each digest stream comprising a plurality of digest values, and each digest value being associated with a respective image frame;
examining the candidate video feed to produce a candidate digest stream comprising digest values;
comparing the digest values of the candidate digest stream against the digest values of the digest streams of the camera video streams in the digest record; and
outputting a comparison result indicating one of the plurality of camera video streams as being currently present within the candidate video feed when the comparing indicates a match between the respective digest values.

2. The method of claim 1, wherein the candidate video feed comprises segments selected from amongst the plurality of camera video streams, wherein the outputting identifies the camera video stream as being currently present in a relevant segment of the candidate video feed.

3. The method of claim 1, wherein the camera video streams are each camera feeds for a broadcast program, the candidate video feed is a video clean feed obtained by selecting amongst the camera feeds over time, and the outputting identifies one of the camera feeds as being currently live on air in the video clean feed.

4. The method of claim 1, further comprising:
preparing a plurality of masking signals each associated with a respective one of the camera video streams, each said masking signal identifying a region of interest within the respective camera video stream;
selecting one of the masking signals according to the comparison result; and
applying the selected one of the masking signals to the candidate video feed.

5. The method of claim 1, further comprising:
comparing a sequence of the digest values obtained from the candidate video feed against respective sequences of the digest values in the digest record; and
outputting the comparison result indicating a match between the candidate video feed and a respective sequence of image frames in the respective one of the camera video streams.

6. The method of claim 1, further comprising:
calculating a distance between a candidate digest value from the candidate video feed and one or more of the digest values in the digest record, and
comparing the candidate digest value against the digest values in the digest record according to the calculated distance.

7. The method of claim 1, wherein the match is determined by inexactly comparing a candidate digest value with the digest values in the digest record within a tolerance threshold.

8. The method of claim 1, wherein the match is determined by a nearest neighbour ratio threshold between a candidate digest value and two or more closest digest values from the digest record.

9. The method of claim 1, wherein obtaining each digest value comprises:
examining a plurality of sample groups of pixel values to provide numerical sample values, and
performing a dimension reduction on the sample values to provide the digest value.

10. The method of claim 1, further comprising:
extracting noise features from a respective image frame, and
performing a dimension reduction on the extracted noise features to provide the digest value.

11. The method of claim 10, further comprising:
filtering an original image to provide a noise filtered image;
subtracting the original image from the noise filtered image to provide a noise residual image;
sampling pixel values from the noise residual image to provide a plurality of sample values; and
performing a dimension reduction to obtain the digest value from the plurality of sample values.

12. The method of claim 1, further comprising detecting a delay event wherein one of the camera video streams appears in the candidate video feed after a time delay.

13. The method of claim 1, further comprising detecting a replay event wherein one of the camera video streams is repeated again in the candidate video feed after a time delay.

14. A computing device for use in identifying image frames in a video stream, the computing device comprising a processor and a memory, the memory containing instructions executable by the processor whereby the processor is configured to:
receive a plurality of camera video streams from a plurality of cameras covering an event, and a candidate video feed formed by switching among the plurality of camera video streams, wherein a selected one of the plurality of camera video streams appears within the candidate video feed at any one time, produce a digest record comprising a respective digest stream comprising a plurality of digest values for each camera video stream, examine the candidate video feed to produce respective digest values, compare the digest values of the candidate video feed against the digest values of the camera video streams, and output a comparison result indicating that a respective one of the plurality of camera video streams is currently present within the candidate video feed when the comparing indicates a match between the respective digest values.

15. The computing device of claim 14, wherein the digest streams in the digest record are ordered by time and wherein comparing the digest values of the candidate video feed against the digest values of the camera video streams comprises:

firstly searching the digest record at a current time point, and secondly searching the digest record progressively older in time form the current time point.

16. The computing device of claim 14, wherein the comparison result further indicates that no match has been found when, according to the digest record, the candidate video feed does not match with any of the camera video streams.

17. The computing device of claim 14, wherein the digest streams of the camera video streams are recorded separately from recordings of the camera video streams themselves.

18. The computing device of claim 14, wherein camera video streams are transmitted from a source location to a destination location by a first communication channel, and wherein the digest streams of the camera video streams are transmitted separately to the destination location by a second communication channel.

19. The computing device of claim 14, wherein the candidate video feed is synchronized with an auxiliary video signal using the digest values.

\* \* \* \* \*